United States Patent
Brown et al.

(10) Patent No.: US 9,480,908 B2
(45) Date of Patent: Nov. 1, 2016

(54) WORD GUESSING GAMES FOR MARKET RESEARCH

(71) Applicant: Upfront Analytics Ltd., Dublin (IE)

(72) Inventors: Amber Raschel Aurora Brown, Wicklow (IE); Joseph William Marks, Dublin (IE)

(73) Assignee: UPFRONT ANALYTICS INC., Dublin (IE)

( * ) Notice: Subject to any disclaimer, the term of this patent is extended or adjusted under 35 U.S.C. 154(b) by 120 days.

(21) Appl. No.: 14/070,187

(22) Filed: Nov. 1, 2013

(65) Prior Publication Data

US 2014/0128136 A1  May 8, 2014

Related U.S. Application Data

(60) Provisional application No. 61/722,882, filed on Nov. 6, 2012.

(51) Int. Cl.
| | | |
|---|---|---|
| *A63F 13/00* | (2014.01) | |
| *A63F 3/04* | (2006.01) | |
| *G06Q 30/02* | (2012.01) | |
| *G07F 17/32* | (2006.01) | |
| *A63F 9/18* | (2006.01) | |

(52) U.S. Cl.
CPC .......... *A63F 13/005* (2013.01); *A63F 3/0421* (2013.01); *A63F 3/0423* (2013.01); *G06Q 30/0202* (2013.01); *G06Q 30/0209* (2013.01); *G07F 17/3279* (2013.01); *A63F 2009/186* (2013.01); *A63F 2300/8064* (2013.01)

(58) Field of Classification Search
CPC .................... G06Q 30/0201; G06Q 30/0203; G06Q 30/02; G06Q 50/01; G06Q 30/0261; A63F 13/005; A63F 13/12; A63F 13/30; A63F 13/46; A63F 2300/8064
See application file for complete search history.

(56) References Cited

U.S. PATENT DOCUMENTS

| | | | |
|---|---|---|---|
| 8,342,928 B1* | 1/2013 | Teller et al. | 463/9 |
| 2007/0213111 A1* | 9/2007 | MacIver et al. | 463/9 |
| 2012/0178073 A1* | 7/2012 | Wasmund | 434/362 |

(Continued)

OTHER PUBLICATIONS

GrubbsieDev, Word Charades—Taboo style game, Sep. 7, 2012, <https://itunes.apple.com/tt/app/word-charades/id430751696?mt=8>.*

(Continued)

*Primary Examiner* — Justin Myhr
(74) *Attorney, Agent, or Firm* — Davis Wright Tremaine LLP; Philip H. Albert

(57) ABSTRACT

A system is described for a computer-based word-guessing game that can be used to elicit market-research data, specifically sentiment and awareness data. The two-person game involves a clue giver and a guesser, each playing on their own mobile device. The clue giver sends clues to induce the guesser to guess a given target word or phrase before a countdown clock runs out. The clues used and the guesses made can be analyzed to reveal the opinions and knowledge that the players have about products, brands, and people. The game features a novel mechanic in which the clue words are categorized according to how obvious they are. Using more-obvious clues causes the countdown clock to decrement faster, thereby making the game play more strategic and entertaining, while also incentivizing the clue giver to use less-obvious, sentiment-oriented words that are more useful for market-research purposes.

20 Claims, 9 Drawing Sheets

(56) References Cited

U.S. PATENT DOCUMENTS

2013/0035981 A1 2/2013 Brown et al.
2013/0035989 A1 2/2013 Brown et al.

OTHER PUBLICATIONS

"Taboo (game)" Wikipedia, the free encyclopedia. Updated Feb. 20, 2016. 4 Pages. Retreived Mar. 16, 2016 from <https://en.wikipedia.org/w/index.php?title=Taboo_(game)&oldid=706006307>.

"Train of Thought (2011)," Board Game Geek. 3 Pages. Retreived Mar. 16, 2016 from <https://boardgamegeek.com/boardgame/56835/train-thought>.

Lopez, "Knowsy Knows Ad Games," Gamification Co. 2 Pages. Apr. 19, 2011. Retreived Mar. 16, 2016 from <http://www.gamification.co/2011/04/19/knowsy-knows-ad-games/>.

Schonfeld, "HowMutch Will Brands Pay to Get You to Answer Questions About Their Products?" TechCrunch. Oct. 14, 2010. 2 Pages. Retreived Mar. 16, 2016 from <http://techcrunch.com/2010/10/14/howmutch/>.

* cited by examiner

| Player ID | Gender | Age | Location | Income | Skill | Interests |
|---|---|---|---|---|---|---|
| 319 | M | 23 | MA | Medium | High | cars, dating, football, games |
| 528 | F | 18 | NY | Low | Medium | computers, dating, fashion, movies |
| 973 | F | 48 | CA | High | Low | cars, investing, movies, travel |
| 1643 | M | 33 | FL | Medium | high | Football, food, games, travel |
| --- | --- | --- | --- | --- | --- | --- |

301 / 302 / 303 / 300

WORD GUESSING GAMES FOR MARKET RESEARCH

CROSS-REFERENCE TO RELATED APPLICATION

This application claims priority to U.S. Provisional Patent Application Ser. No. 61/722,882, filed Nov. 6, 2012, entitled "Word Guessing Games for Market Research," which is hereby incorporated herein by reference.

BACKGROUND

There is a general need in commerce for companies and individuals to acquire business intelligence related to their products, brands, and markets. For decades, this has been done via the primary market-research methodologies of surveys, focus groups, and diary studies. However, these methods all suffer from similar shortcomings: very small sample sizes; unrepresentative sampling; an emphasis on stated opinion versus revealed opinion; and high cost, as skilled individuals are needed to design and implement market-research studies.

Analysis of blog postings and tweets has emerged recently as a new way of tracking sentiment and awareness on all kinds of topics. Although techniques such as Twitter® mining purport to capture opinions on a scale that is vastly greater than that possible with standard survey methods, they are problematic for several reasons, such as: the opinions often come from a vocal minority, and can be skewed to extremes; and even with the best algorithms, it is difficult to classify accurately the topic and polarity of free-form text fragments.

Recently some companies have developed games that serve to elicit market-research or business-intelligence data from players. For example, guessing games are one type of game that may be used to collect business intelligence. A word-guessing game is a game in which the objective is to guess a target word or phrase that describes an object, a person, or a concept. Typically these games are played co-operatively by two or more players: one player, the clue giver, knows the target word/phrase, but cannot tell the other(s), the guesser(s), explicitly what it is. However, the clue giver can help the guessers arrive at the target word/phrase with the help of clues. A classic example of such a guessing game is "charades," where a person who knows the topic or item, such as a famous person, gives indirect clues to others until someone or no one can guess the topic or item.

KNOWSY® is an example of a game that was designed specifically to elicit market-research or business-intelligence data from players. One player ranks a list of favorite items around a theme, such as award-nominated movies, New Year's resolutions, or favorite sports teams. His partner tries to guess the order correctly. The rankings chosen by both players can be used to gauge the players' sentiment, awareness, and preferences of products, brands, and people.

Another example of a game designed to elicit market-research data is HowMutch®. It is a single-person game that poses a simple question: "How much would you pay for X?" X can be anything: a product, a dare, or an activity. For example, "How much would someone have to pay you to lick the sole of your shoe?" or "How much would you pay for an unlimited smartphone data plan?" Once the player enters an amount, it is matched with other responses to the same question and a comparison of the player's price versus the median price is shown.

Board games can be a source of inspiration for guessing games that can elicit market-research or business-intelligence data. The board game TABOO® from Hasbro, Inc. is one such game. The objective of the game is for the clue giver to have the guessers guess a given target word on a card without using the word itself or five additional words listed on the card. For example, the clue giver might have to get the guessers to say the word "baseball" without using the words "sport," "game," "pastime," "hitter," "pitcher," or "baseball" itself as clues. The clue giver may not say a part of a taboo word; for example, using "base" in "baseball" is taboo. The clue giver's hints may not rhyme with a taboo word or be an abbreviation of a taboo word.

Train of Thought® from Tasty Minstrel Games is another board game whose mechanic is potentially useful for eliciting market-research data. In this game the clue giver tries to get guessers to guess a given target word on a card by giving a three-word clue, one word of which is mandated, and that cannot include the target word. In the first round, the mandated word is specified on the card. If none of the current round of guesses is correct, the clue-giver creates another three-word clue, using one of the guessed words from the previous round and two other words. For example, the clue giver might have to get the guessers to say the word "cow" by offering a three-word clue that includes the word "eats." So the clue giver might say "what eats grass." If any of the guessers say "cow," then that person wins the game. If instead the guesses are "sheep," "horse," and "lawnmower," then the clue giver must use one of these words in a second three-word clue; and so on until someone guesses the target word/phrase correctly.

Brown and Marks devised a Web-based market-research game called Cascadence that was based on classic word-guessing games like Taboo® and Train of Thought®. As in those games, the clue giver sends clues to induce the guesser to guess a given target word or phrase. In Cascadence the clue giver is presented with a continuous stream of clue words in a Web browser on a computer display, with new words appearing at the top of the screen and old words scrolling off the bottom of the screen. The clue giver can choose which words from the visible part of the stream to send to the guesser to elicit a correct guess. The clue giver can also remove or reorder the words sent to the guesser to communicate further hints about the target word or phrase. The clue words chosen and their de-selection and re-ordering can be interpreted to generate market-research data. However, as in the above conventional board games, there is no incentive for the clue giver to use words that are more revealing of sentiment or knowledge than other words. Moreover, because the number of words visible at any point in the game play is restricted, it is difficult for the clue giver to compare different words for their revelatory power before sending them as clues. Finally, the implementation of the game on a Web browser limits the ability to play the game, as users needed to have access to a suitable network connection, computer, and display.

There is therefore a need for a new guessing game on a new platform to collect primary market-research data from consumers that is more revelatory of players' opinions and knowledge, and that is more accessible and engaging.

BRIEF DESCRIPTION OF THE DRAWINGS

Various embodiments in accordance with the present disclosure will be described with reference to the drawings, in which.

DETAILED DESCRIPTION

Embodiments include a word-guessing game that both entertains and elicits market-research or business-intelligence data. It is designed as a two-person game that involves a clue giver and a guesser, but team play is contemplated. The clue giver sends clues to induce the guesser to guess a given target word or phrase before a countdown clock runs out. The clues used must all come from one of several clue-word lists associated with the given target word/phrase.

The clue giver can view the lists in their entirety at any time during the game. The clue lists are classified according to how obvious the clues are. Measures of obviousness include: the standard information-retrieval measure of usage frequency in spoken or written language; or the frequency of clue selection within the game. As clues are selected by the clue giver, the cost incurred for giving each clue is recorded in the system and may affect game play. For example, in one embodiment, using more-obvious clues causes the countdown clock to decrement faster. The clue giver must therefore decide what mix of obvious and non-obvious clues to use so as to minimize the time lost on the countdown clock before the guesser identifies the target word, thereby making the game play more strategic and more entertaining than traditional games, some of which are described herein. This mechanic also incentivizes the clue giver to use less-obvious, sentiment-oriented words that are more useful for market-research purposes.

High-quality games are inherently engaging over long periods of time, as dedicated players play their favorite games again and again. Mobile games are played by all demographics. And game play may tap into instinctual, revealed preferences that are less susceptible than survey data to contextual issues and demand characteristics ("Why am I being asked this?" "What do they want me to say?" "How do I finish this task as quickly as possible?"). So by structuring games appropriately for market-research purposes, ambiguity and uncertainty in topic and polarity classification can be avoided; by tapping into the broad demographics that play casual mobile games, representative sampling can be performed; and by weaving data collection into engaging game play, revealed sentiment can be measured while avoiding the extremes that occur in unprompted expression. For these and other reasons, data mining of specialized mobile games is an exciting new approach to gathering market-research.

Figure 1:
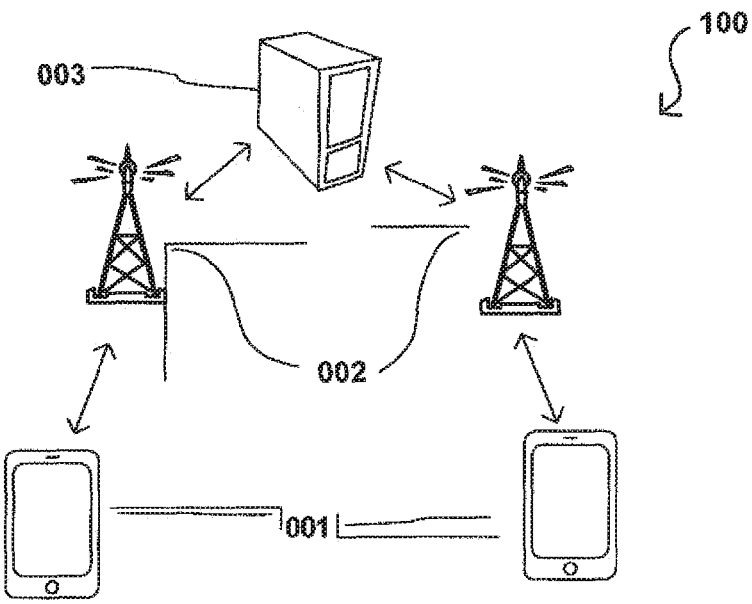
FIG. 1(a) illustrates mobile devices connected via a communications network in accordance with at least one embodiment.
FIG. 1(b) illustrates an initial menu screen in accordance with at least one embodiment.
Figure 1:
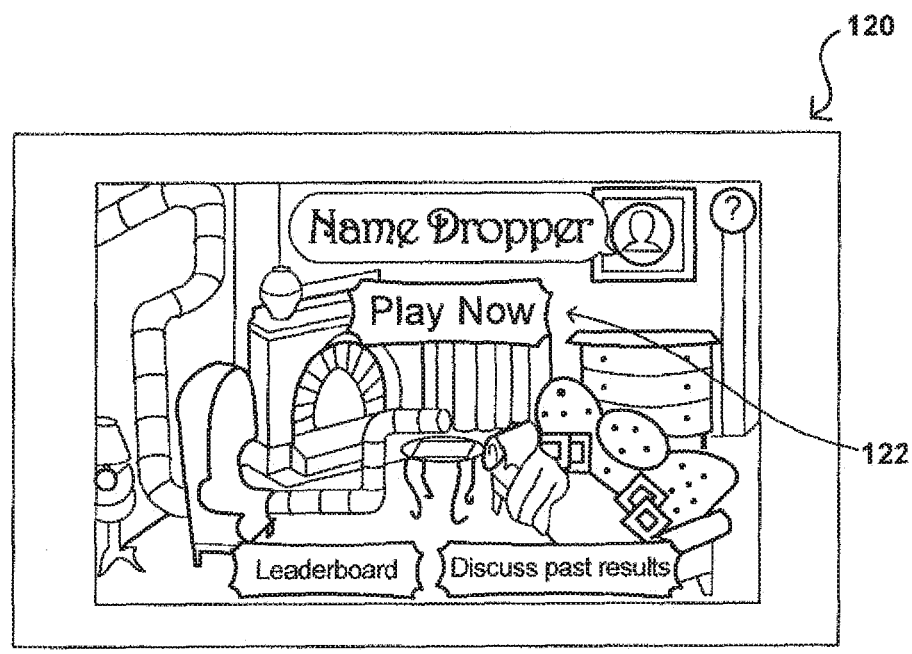
Figures 2, 3:
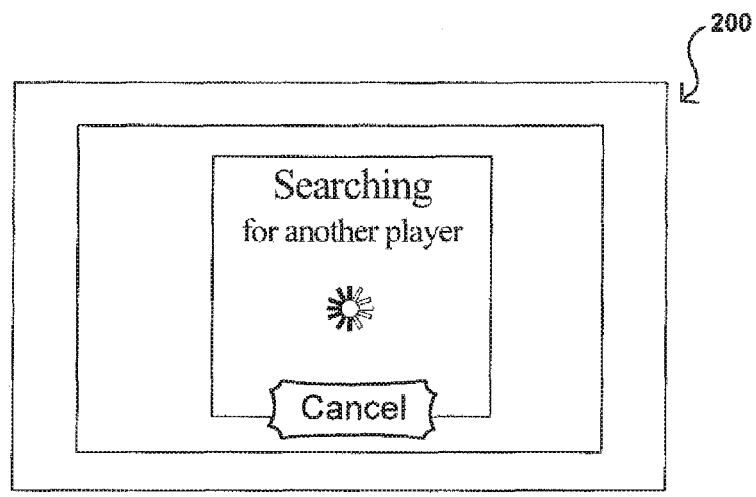
FIG. 2 illustrates an interface while waiting for another player in accordance with at least one embodiment.
FIG. 3 illustrates contents of an example player database in accordance with at least one embodiment.
Figure 4:
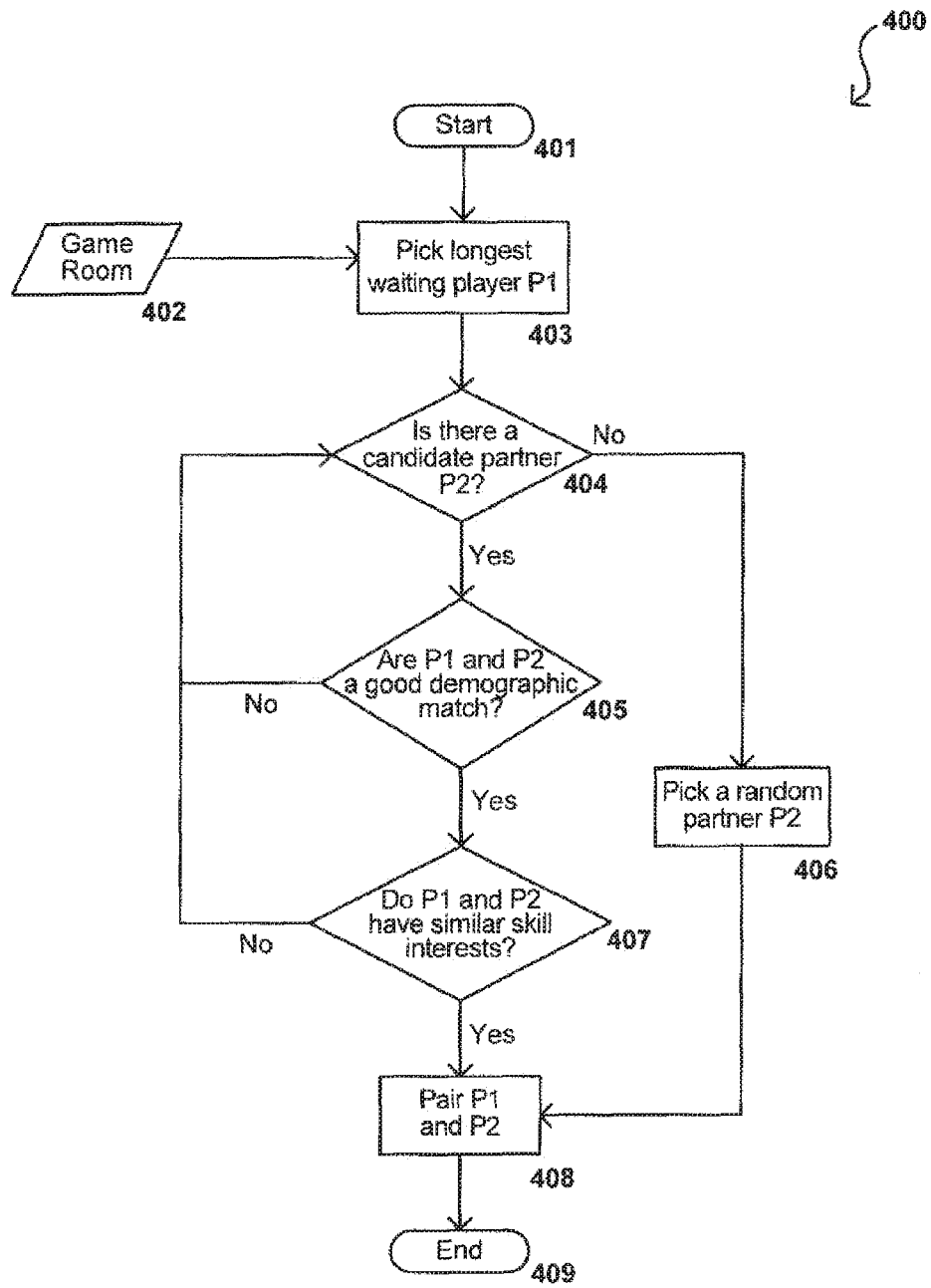
FIG. 4 illustrates an example process for pairing game partners that can be used in accordance with at least one embodiment.
Figure 5:
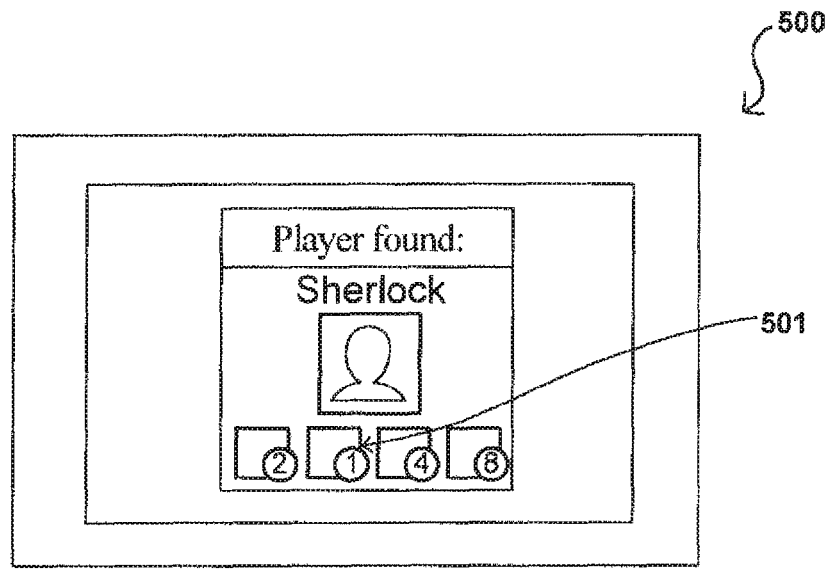
FIG. 5 illustrates an example interface wherein another player has been found, the two players have been paired, and the game is set to begin.

To this end, the inventors have invented Name Game, a word-guessing game played on mobile devices like smartphones, tablets, etc. In one embodiment the game is played by two people, but in other embodiments three or more can play. In the two-player embodiment shown in FIG. 1(a), the system 100 comprises mobile client devices 001 that are connected via a communications network 002 to a game server running on a cloud computer 003. A game consists of multiple rounds of play. When a player activates the Name Game app on their mobile device, the menu screen 120 in FIG. 1(b) is presented to them. From this screen they can choose via a screen button 122 to play the game. At this point the player is informed via the screen 200 in FIG. 2 that the game server is looking for another player who is also waiting to play the game. The game server considers the data in the player database 300, shown in FIG. 3, when potentially pairing two players. The data in the database consists of player IDs 301, demographic data 302, and data about the players' playing skill and interests 303. The pairing algorithm 400 is shown in FIG. 4. The players waiting to play are stored in the game room 402. In step 403 the player who has been waiting the longest is picked as player P1. Step 404 checks if there is a candidate player P2 who is also in the game room and who has not yet been considered for pairing with player P1. If all the players have been considered and none is an ideal match, then P2 is picked randomly 406 and players P1 and P2 are paired 408. If a candidate partner P2 is identified at step 404, then that player is tested for demographic compatibility with player P1 405. For example, two players would be considered as demographically compatible if they had similar values for their demographic attributes 302 in the player database. If a candidate partner P2 is still in consideration after step 405, then that player is tested for skill and interest compatibility with player P1 407. For example, two players would be considered as being compatible if they had similar values for their skill and interest attributes 303 in the player database. If a candidate partner P2 passes both steps 405 and 407 then players P1 and P2 are paired 408. When player pairing happens at step 408, the players are informed via the screen display 500 in FIG. 5 that they have a playing partner and the game is about to commence. The skill, interests 303, and past achievements in the game of the other player are depicted by the badge images 501, so that each player has some knowledge about the skill and interests of the player with whom he is paired.

Figure 6:
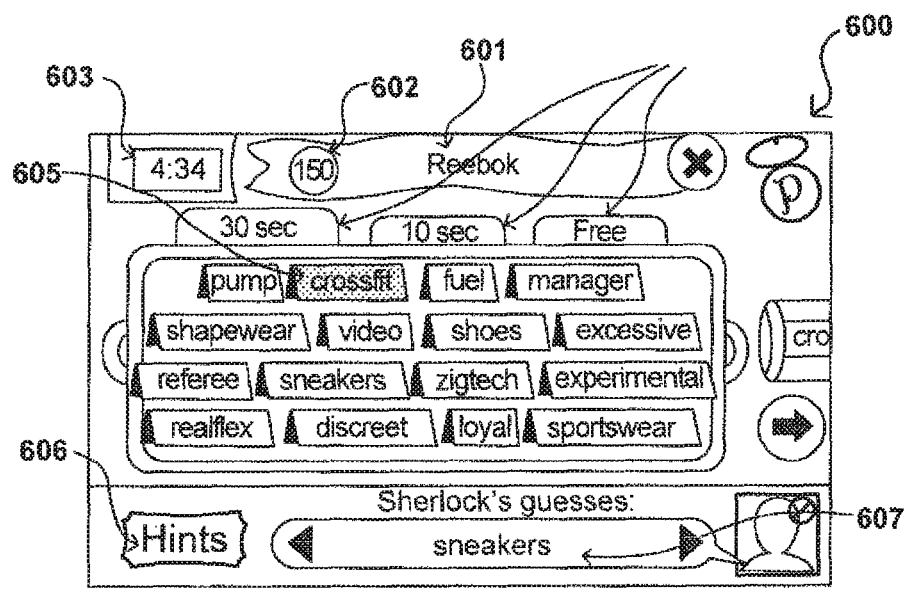
FIG. 6 illustrates an example clue-giver's screen, showing the obvious clues for the target word 'Brand-R,' a hypothetical manufacturer of athletic shoes. The countdown clock is decremented by 30 seconds for each of these clues that is sent to the guesser in this embodiment.

During each round of play in which one name or word is guessed, one player is the clue giver, and the other is the guesser. The clue giver is presented with a target word or phrase and must send clues to the guesser that induce him to guess the given target word/phrase as quickly as possible. In FIG. 6 the clue-giver's screen 600 is showing that the target word is 'Brand-R' 601, which is worth 150 points 602 to each player if the word is correctly guessed by the guesser. If the target word is too difficult, the clue giver can opt to skip it by pressing the skip button 606. However, skipping a target word reduces the maximum score achievable in a game.

In one embodiment, the target word or phrase may be configured using objects or symbols, images of objects, virtual objects, images generated procedurally, and the like. For example, the word "tree" may be illustrated using an image, which may be made using virtually any image generation method, such as a picture, drawing, painting, lines, dots, and the like.

The object may also be represented by a negative or absence thereof or a collection of images to form the object. For example, a tree outlined by a background, or tree illustrated by a bunch of leaves that are not interconnected, or a collage of other images formed to be a tree image.

In another embodiment, the objects may be symbolic or added to create meaning. For example, a "banana milk shake" where a banana is shown then the "+" sign, then a "milk" container, then a "+" sign, then a "shaking object" with an "=" sign at the end to convey the sum of the image meanings is a "banana milk shake".

Figure 7:
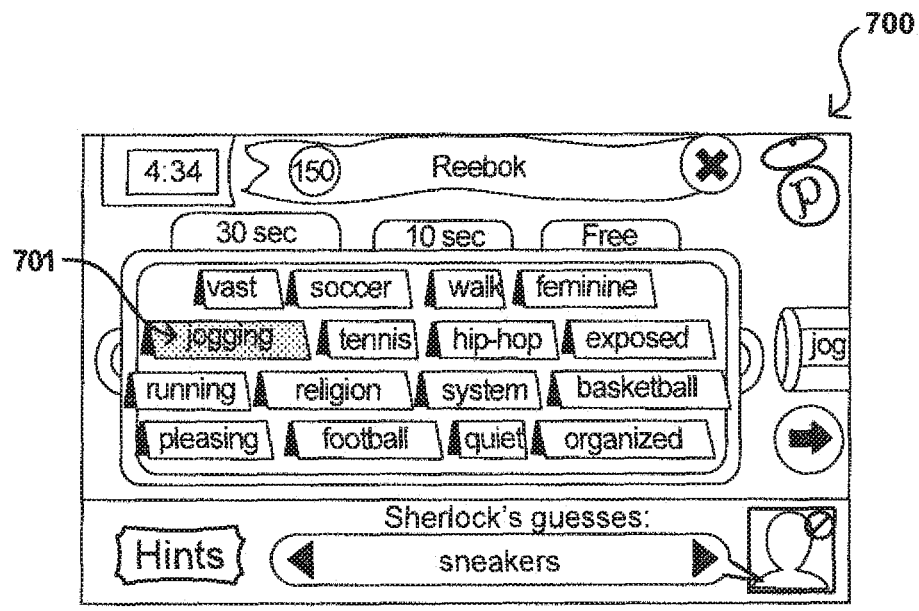
FIG. 7 illustrates an example clue-giver's screen, showing the mid-level clues for the target word 'Brand-R.' The countdown clock is decremented by 10 seconds for each of these clues that is sent to the guesser.
Figure 8:
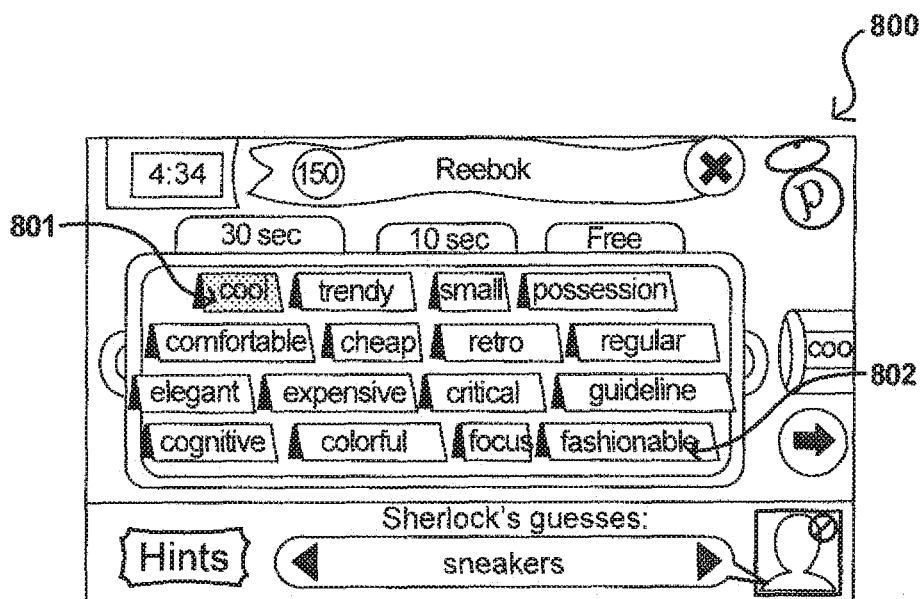
FIG. 8 illustrates an example clue-giver's screen, showing the sentiment-oriented clues for the target word 'Brand-R.' The countdown clock is not affected by the use of these clues.

In one embodiment, Name Game, all the clues sent to the guesser by the clue giver are derived from one of three lists: an "obvious" list where the clues are most helpful to the guesser, shown in FIG. 6; a "mid-level" list with clues that are less obvious, shown in FIG. 7; and a "sentiment" list, containing only generic sentiment words, shown in FIG. 8. Included in all of these word lists are distractor words, to force people to concentrate and think carefully about the words they select as clues. Words are chosen by selecting them via a touch screen or stylus. There is a cost incurred for each word chosen. The cost is recorded in the system and may affect game play. In this embodiment, choosing a word from the obvious list decrements the countdown clock 603 by 30 seconds; a word from the mid-level list decrements it by 10 seconds; and words from the sentiment list do not incur any extra penalty, hence those clue words are 'free'. The game is thus structured to encourage the clue giver to provide sentiment associations over factual and obvious associations (although these can also be useful from a market-research perspective). The clue giver can move between these word-list screens by selecting one of the appropriate tabs 604. The clue giver can adopt various strategies in choosing which combination of obvious, mid-level, and sentiment words to send.

At the point in the game depicted in FIGS. 6-9, the clue giver has chosen the following clues to induce the guesser to guess 'Brand-R': 'crossfit' 605 from the obvious list, 'jogging' 701 from the mid-level list; and 'cool' 801 and 'fashionable' 802 from the sentiment list.

Figure 9:
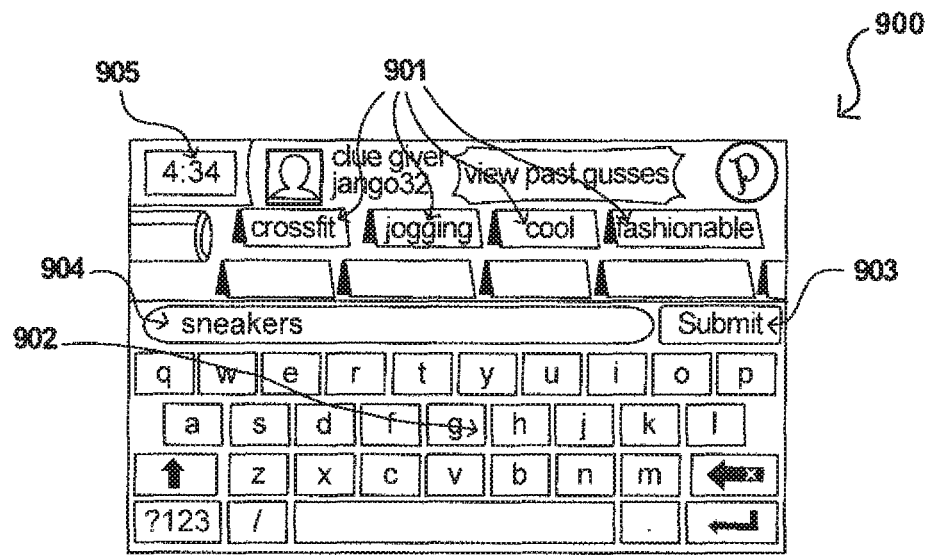
FIG. 9 illustrates an example guesser's screen, showing four clues from the clue giver and the first guess from the guesser.

The guesser's screen 900 at the same moment in the game is shown in FIG. 9. He has received the clues 901 sent by the clue giver. The guesser types in his guesses via the soft keyboard 902 and sends it to the clue giver by pressing the 'submit' button 903. In the game depicted, the guesser's initial guess is 'sneakers' 607, 904.

Figure 10:
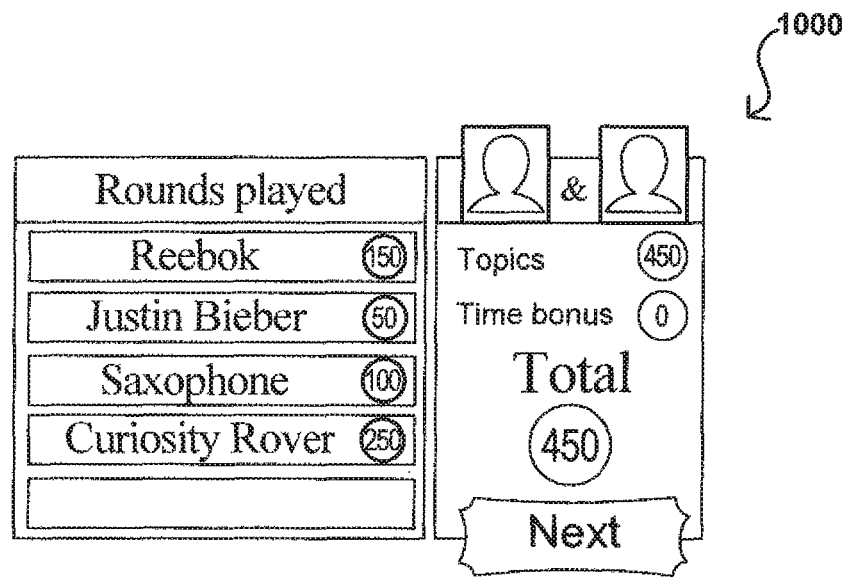
FIG. 10 illustrates an example results screen, showing results from several rounds of play in one game between the same players alternating in the roles of clue giver and guesser.

When the countdown clock 603, 905 reaches zero the game ends and the results from the several rounds of play comprising one complete game are summarized in the results screen 1000 shown in FIG. 10.

Figure 11:
FIG. 11 illustrates two example word clouds showing the relative frequency with which the free, sentiment-oriented words were chosen for the target word 'Brand-R' on the left and the target word 'Brand-P' on the right.
Figure 12:
FIG. 12 illustrates two example word clouds showing the relative frequency with which the mid-level, activity-oriented words were chosen for the target word 'Brand-N' on the left and the target word 'Brand-P' on the right.
Figure 13:
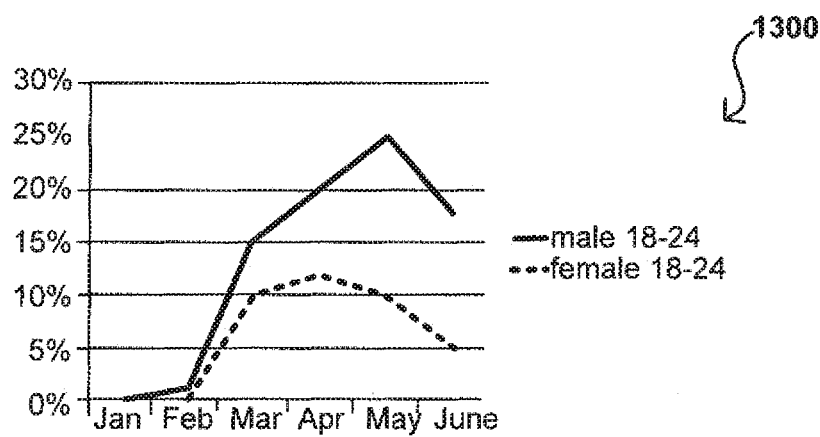
FIG. 13 is a plot illustrating an example frequency with which two different demographic categories, males aged 18-24 and females aged 18-24, used the clue 'fuel' for the target word 'Brand-N' over a six-month period in which Brand-N began promoting a new product called 'fuel'.

As an example, the selected clue words in the example scenario from FIGS. 6-9 show an awareness of a recent Brand-R product initiative, 'crossfit'; an association of Brand-R with jogging; and some positive sentiment about the brand. By integrating game-play data from thousands of highly engaged players over days, weeks, or months, we can discern significant patterns of awareness and sentiment. FIGS. 11-13 show hypothetical visualizations of such integrated data. FIG. 11 contains two word clouds 1100 that show the relative frequency with which free, sentiment-oriented words were chosen for the target word 'Brand-R' on the left and the target word 'Brand-P' on the right. The word clouds show that Brand-R's shoes are perceived as colorful and fashionable, whereas Brand-P's shoes are perceived as cheap and retro. FIG. 12 contains two word clouds 1200 that show the relative frequency with which mid-level, activity words were associated with the target words 'Brand-N' on the left and 'Brand-P' on the right. The word clouds show that Brand-N was associated primarily with running, football, and basketball, whereas Brand-P is associated primarily with soccer. Finally, the chart 1300 in FIG. 13 shows the relative selection frequency of the clue 'fuel' for the target word 'Brand-N' by two demographic segments over a six-month period in which Brand-N introduced a new product called 'fuel'. This visualization therefore tracks the degree to which the new product campaign has been noticed by males and females in the 18-24 age range: males were more receptive to the campaign than females, with both groups going from low initial name recognition to high recognition, and then to the beginning of a decline in recognition as the marketing campaign slackened.

Figure 14:
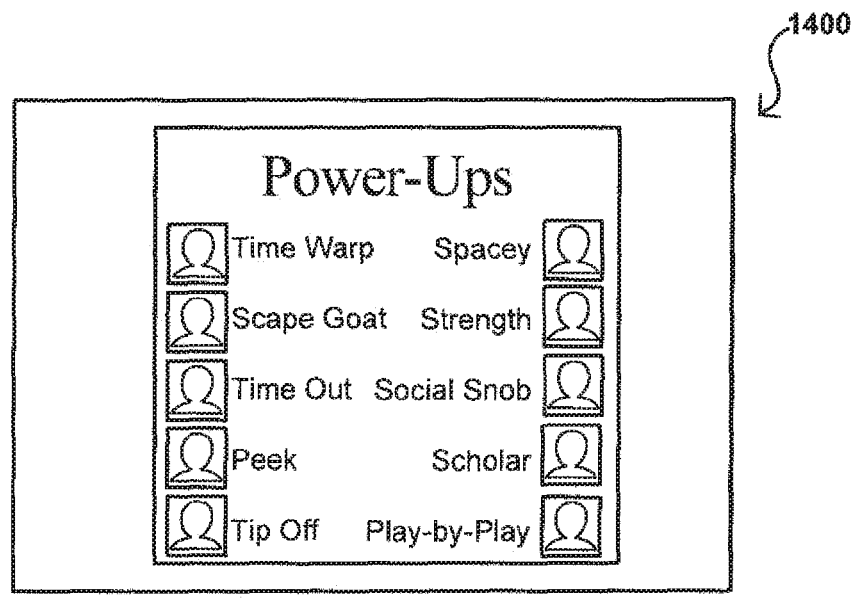
FIG. 14 illustrates example power-up options that can be provided in accordance with various embodiments.

Finally, the screen display 1400 in FIG. 14 shows a list of power-ups for the Name Game game. Power-ups unlock entertaining game features that can be given to players as rewards or that can be sold to players for virtual or real currency. The power-ups for Name Game listed in FIG. 14 are:

Time Warp: This reduces the time penalty for each clue during one round of play.

Spacey: This power-up tells the guesser how many letters are in the target word.

Scape Goat: With this power-up, the clue giver can decide to pass on a given target word and substitute a new one with no time penalty.

Strength: Playing this power-up gives the clue giver a list of clue words that have worked well in the past for other players who were given the same target word.

Time Out: This enables the clue giver to freeze the countdown clock for a period of time, during which the guesser can still type in guesses.

Social Snob: Either player can use this power-up, which increases the degree of similarity in skill and interests used in the player-pairing algorithm 400.

Peek: The guesser can use this power-up to obtain a momentary glimpse of all the obvious clues that are available to the clue giver.

Scholar: Either player can use this power-up to pick a theme for the target words in all the rounds of a complete game.

Tip Off: This gives the guesser the first letter of the target word.

Play-by-Play: This power-up adds some additional words to the free list, in particular words that can be used to direct the guesser, such as 'warm', 'cold', 'almost', etc.

Tough: This power can be used to change the target words to make them easier or harder to guess.

In other embodiments, the target words and clue lists presented to the players may depend on physical context. For example, certain target words and clues may be associated with specific geographic locations, e.g., 'sneakers' and 'tennis shoes' are the preferred terms for athletic shoes in different parts of the United States. The context may even be very local, with different target words and clues used if the players are in different types of buildings, such as a church, workplace, home, hotel, store, restaurant, and the like. The location data used to establish context may be derived from user-supplied data in the player database 300 or by using a technological method such as GPS, IP address, etc.

In one embodiment, the domains of the target words presented to the players may be varied based on the interests listed in the user-supplied data in the player database 300, or in response to user input by the players. In another embodiment, the reading level of the target words and clues presented to the players may be varied based on user-supplied data in the player database 300, or in response to user input by the players.

In order for the Name Game game to be as entertaining as possible and also for the game to elicit the most useful market-research data, care must be taken to derive suitable and varied target words and clue lists. The cost of deriving target words and clue lists for Name Game can represent a significant fraction of the development cost for the entire system. It is therefore advantageous to develop cost-effective means for deriving target words and clue lists.

In one embodiment, target words and clue words may be generated by crowdsourcing, i.e., receiving responses to queries by teams of human contributors, typically via the Internet. For example, the clues may be generated by posing a question to a crowdsourcing service such as Amazon's Mechanical Turk® and then retrieving answers. A question like "what things are blue?" could be sent to several participants in the crowdsourcing system and their answers combined and filtered to improve quality. For example, one player might answer "water", "sky", and "berries", while another might answer "sky", "mold", and "jazz". By picking only words that are reported multiple times, like "sky" in this example, the quality and obviousness of the words can be improved.

In another embodiment, target words and clue words for the Name Game game may be crowdsourced by having human contributors play a word game. For example, a game like Pictionary® could be used to get contributors to generate lists of words that describe the same drawn image.

Clues may also be generated by extracting words, objects, and the like from on-line and physical documents. For example, an OCR device may be configured to "read" documents to extract words, or a Web 'bot' could be configured to extract target words and clue words from documents on the World Wide Web.

Figure 15:
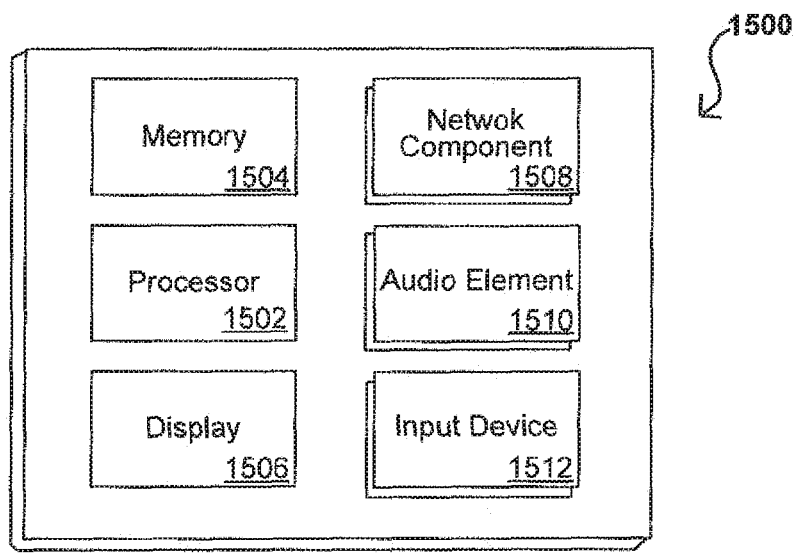
FIG. 15 illustrates example components of a computing device that can be utilized in accordance with various embodiments.

FIG. 15 illustrates a logical arrangement of a set of general components of an example computing device 1500 that is used in the Name Game system 100. In this example, the device includes at least one processor 1502 for executing instructions that can be stored in a memory device or element 1504. As would be apparent to one of ordinary skill in the art, the device can include many types of memory, data storage, or non-transitory computer-readable storage media, such as a first data storage for program instructions for execution by the processor 1502, a separate storage for images or data, a removable memory for sharing information with other devices, etc. The device typically will include some type of display element 1506, such as a touch screen or liquid crystal display (LCD), although devices such as portable media players might convey information via other means, such as through audio speakers. As discussed, the device in many embodiments will include at least one input element 1512 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 1500 of FIG. 15 can include one or more network interface elements 1508 for communicating over various networks, such as a Wi-Fi, Bluetooth, RF, wired, or wireless communication systems. The device in many embodiments can communicate with a network, such as the Internet, and may be able to communicate with other such devices. The example device can include one or more audio elements 1510 as well, such as may include one or more speakers for generating audio output and/or one or more microphones for receiving audio input, such as voice commands from a user.

Figure 16:
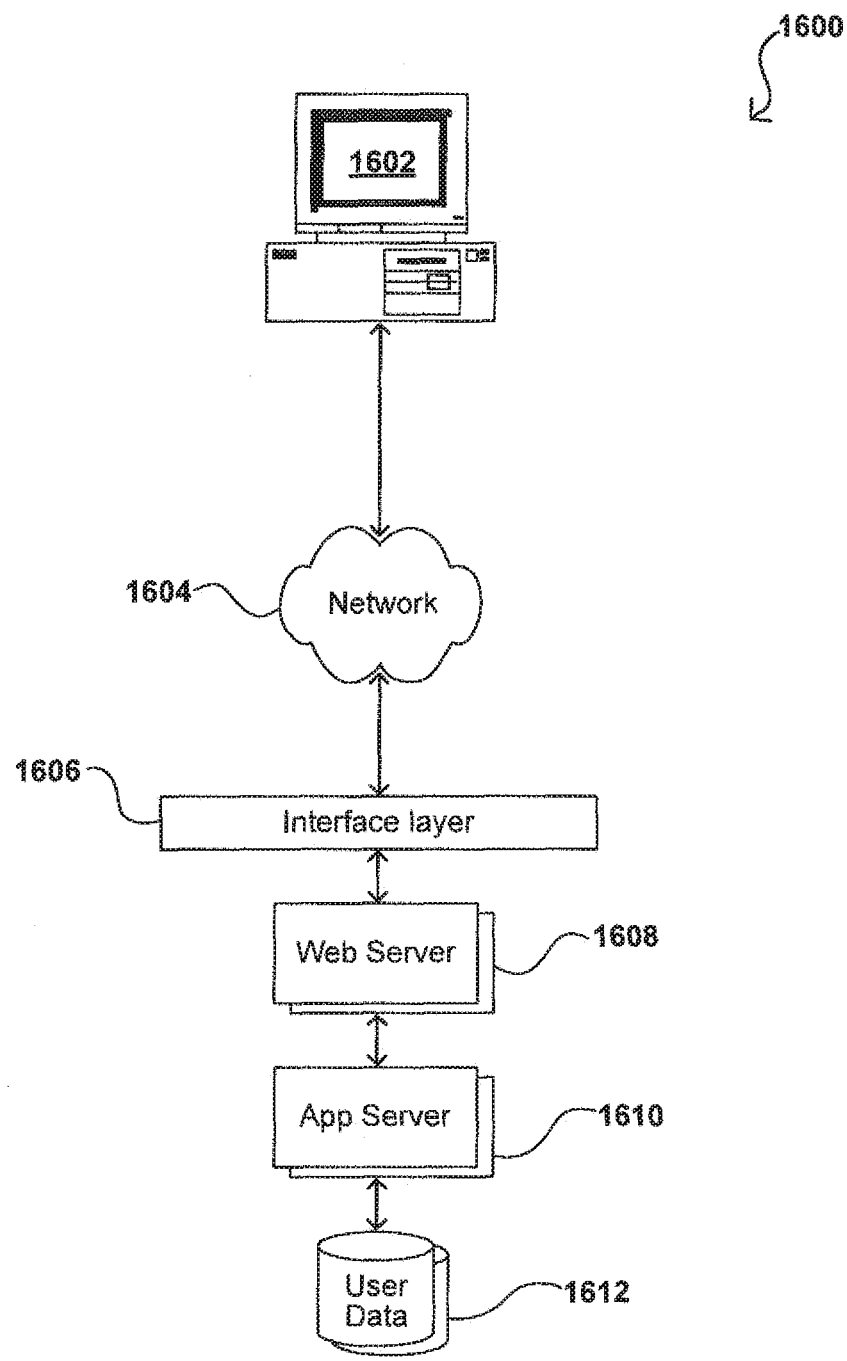
FIG. 16 illustrates an example environment in which various embodiments can be implemented.

FIG. 16 illustrates an example environment 1600 in which various embodiments can be implemented. Example environments discussed herein for implementing aspects in accordance with various embodiments are primarily Web-based, as relate to Web services and cloud computing, but it should be appreciated that, although a Web-based environment is used for purposes of explanation, different environments may be used, as appropriate, to implement various embodiments. Client devices 1602 used with various embodiments can include any appropriate device operable to send and receive requests, messages, or information over at least one appropriate network 1604 and convey information back to a user of the device. Examples of such client devices include personal computers, smart phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof.

In at least some embodiments, a request from the client device can be received to an interface layer 1606 associated with a destination address of the request, where the interface layer can include components such as routers, load balancers, application programming interfaces, and the like. The interface layer can receive the request and direct information for the request to one or more computing resources, such as one or more Web servers 1608 and/or one or more application servers 1610, which can process the request using data in one or more data stores or databases 1612 in at least some embodiments. It should be understood that there can be several application servers, layers, or other elements, processes, or components, which may be chained or otherwise configured, which can interact to perform tasks as discussed and suggested herein. As used herein a data store refers to any device or combination of devices capable of storing, accessing, and retrieving data, which may include any combination and number of data servers, databases, data storage devices, and data storage media, in any standard, distributed, or clustered environment. A server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

Each server typically will include an operating system that provides executable program instructions for the general administration and operation of that server, and typically will include a non-transitory computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 16. Thus, the depictions of various systems and services herein should be taken as being illustrative in nature, and not limiting to the scope of the disclosure.

Various aspects can be implemented as part of at least one service or Web service. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks. Various embodiments utilize at least one network that would be familiar to those skilled in the art for supporting communications using any of a variety of commercially-available protocols, such as TCP/IP. The network can be, for example, a local area network, a wide-area network, a virtual private network, the Internet, an intranet, a cellular network, an extranet, a public switched telephone network, an infrared network, a wireless network, and any combination thereof. Server(s) may be capable of executing programs or scripts in response requests from user devices, such as by executing one or more Web applications that may be implemented as one or more scripts or programs written in any programming language, such as Java® or C++, or any scripting language, such as Perl or Python, as well as combinations thereof. The server(s) may also include any of a number of different database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A networked computer system for generating marketing data, comprising:
    a player database comprising records related to players of a plurality of players, a record including, for a player, a player ID of the player and demographic data of the player;
    a game data database comprising records related to game rounds, wherein a game round record includes an answer and a list of clues that can be offered from a first clue-giving player to a guessing player for the guessing player to attempt to guess the answer;
    a weighting generator for generating cost weights for a plurality of clues in the list of clues for a game round record, wherein the weighting generator generates cost weights such that, over a distributed plurality of game rounds played a plurality of times, selections of clues by the clue-giving player from the list of clues is more reflective of revealed sentiment than of stated opinion, wherein cost weights for more obvious clues are greater than cost weights for less obvious clues and clues more reflective of revealed sentiment than of stated opinion;
    a game results database that records clue selections by a plurality of clue-giving players, wherein the plurality of clue-giving players comprises a large enough number of clue-giving players to result in the selections of clues by the plurality of clue-giving players being more reflective of revealed sentiment distributed over the large enough number of clue-giving players than of individual stated opinions or preferences; and
    logic for converting game results from the game results database into the marketing data.

2. The networked computer system of claim 1, further comprising:
    logic for pairing available players based on time spent waiting pairing and on player demographic information; and
    a graphical interface for conveying a clue-selection game display to the clue-giving player and a guessing game display to the guessing player, wherein the clue-selection game display provides a selection of clues and cost weights for the clues in the selection of clues to the clue-giving player and the guessing game display provides for display of the selected clues to the guessing player.

3. The networked computer system of claim 2, further comprising:
    a shared countdown clock visible in the clue-selection game display and in the guessing game display that indicates a time remaining for paired players to play one game round.

4. The networked computer system of claim 3, wherein a cost incurred for giving each clue is a specific adjustment to the shared countdown clock.

5. The networked computer system of claim 2, wherein the logic for pairing the available players also comprises pairing the available players by one or more of geographic location, common interests, and skill level.

6. The networked computer system of claim 1, wherein a cost incurred for giving each clue is specified in a currency.

7. The networked computer system of claim 1, further comprising:
    a plurality of clue-selection game displays, presented to at least some of the plurality of players including the clue-giving player, wherein a clue-selection game display includes a representation of the list of clues and their respective cost weights, thereby allowing the clue-giving player to select clues from among the list of clues; and
    a plurality of guessing game displays, presented to at least some of the plurality of players including the guessing player, wherein a guessing game display includes a representation of clues selected by the clue-giving player and a countdown timer, wherein an initial value of the countdown timer is a function of cost weights assigned to the clues selected by the clue-giving player and shown to the guessing player, with more obvious clues causing the countdown timer to be more decremented than for less obvious clues, for sentiment-oriented words, and/or for words more useful for market research purposes.

8. A computer implemented method for generating marketing data, comprising:
    receiving records from a player database comprising records related to players of a plurality of players, a record including, for a player, a player ID of the player and demographic data of the player;
    receiving records related to game rounds from a game data database, wherein a game round record includes an answer and a list of clues that can be offered from a first clue-giving player to a guessing player for the guessing player to attempt to guess the answer;
    receiving cost weights from a weighting generator for a plurality of clues in the list of clues for a game round record, wherein the weighting generator generates the cost weights such that, over a distributed plurality of game rounds played a plurality of times, selections of clues by the clue-giving player from the list of clues is more reflective of revealed sentiment than of stated opinion, wherein cost weights for more obvious clues are greater than cost weights for less obvious clues and clues more reflective of revealed sentiment than of stated opinion;
    presenting a plurality of clue-selection game displays to at least some of the plurality of players including the clue-giving player, wherein a clue-selection game display includes a representation of the list of clues and their respective cost weights, thereby allowing the clue-giving player to select clues from among the list of clues;
    presenting a plurality of guessing game displays to at least some of the plurality of players including the guessing player, wherein a guessing game display includes a representation of clues selected by the clue-giving player and a countdown timer, wherein an initial value of the countdown timer is a function of cost weights assigned to the clues selected by the clue-giving player and shown to the guessing player, with more obvious clues causing the countdown timer to be more decremented than for less obvious clues, for sentiment-oriented words, and/or for words more useful for market research purposes;

recording clue selections by a plurality of clue-giving players in a game results database that records the clue selections by a plurality of clue-giving players, wherein the plurality of clue-giving players comprises a large enough number of clue-giving players to result in the selections of clues by the plurality of clue-giving players being more reflective of revealed sentiment distributed over the large enough number of clue-giving players than of individual stated opinions or preferences; and converting game results from the game results database into the marketing data.

9. The method of claim 8, further comprising:

pairing available players based on time spent waiting pairing and on player demographic information; and conveying on a graphical interface the clue-selection game display to the clue-giving player and the guessing game display to the guessing player, wherein the clue-selection game display provides a selection of clues and cost weights for the clues in the selection of clues to the clue-giving player and the guessing game display provides for display of the selected clues to the guessing player.

10. The method of claim 9, further comprising:

presenting a shared countdown clock visible in the clue-selection game display and in the guessing game display that indicates a time remaining for paired players to play one game round.

11. The method of claim 10, wherein a cost incurred for giving each clue is a specific adjustment to the shared countdown clock.

12. The method of claim 9, wherein pairing available players comprises paring the available players also by one or more of geographic location, common interests, and skill level.

13. The method of claim 8, wherein a cost incurred for giving each clue is specified in a currency.

14. A non-transitory computer readable medium comprising instructions executable by a processor for:

receiving records from a player database comprising records related to players of a plurality of players, a record including, for a player, a player ID of the player and demographic data of the player;

receiving records related to game rounds from a game data database, wherein a game round record includes an answer and a list of clues that can be offered from a clue-giving player to a guessing player for the guessing player to attempt to guess the answer;

receiving cost weights from a weighting generator for a plurality of clues in the list of clues for a game round record, wherein the weighting generator generates the cost weights such that, over a distributed plurality of game rounds played a plurality of times, selections of clues by the clue-giving player from the list of clues is more reflective of revealed sentiment than of stated opinion, wherein cost weights for more obvious clues are greater than cost weights for less obvious clues and clues more reflective of revealed sentiment than of stated opinion;

recording clue selections by a plurality of clue-giving players in a game results database that records the clue selections by a plurality of clue-giving players, wherein the plurality of clue-giving players comprises a large enough number of clue-giving players to result in the selections of clues by the plurality of clue-giving players being more reflective of revealed sentiment distributed over the large enough number of clue-giving players than of individual stated opinions or preferences; and converting game results from the game results database into marketing data.

15. The computer readable medium of claim 14, further comprising instructions for:

pairing available players based on time spent waiting pairing and on player demographic information; and conveying on a graphical interface a clue-selection game display to the clue-giving player and a guessing game display to the guessing player, wherein the clue-selection game display provides a selection of clues and cost weights for the clues in the selection of clues to the clue-giving player and the guessing game display provides for display of the selected clues to the guessing player.

16. The computer readable medium of claim 15, further comprising instructions for:

presenting a shared countdown clock visible in the clue-selection game display and in the guessing game display that indicates a time remaining for paired players to play one game round.

17. The computer readable medium of claim 16, wherein a cost incurred for giving each clue is a specific adjustment to the shared countdown clock.

18. The computer readable medium of claim 15, wherein pairing the available players comprises paring the available players by one or more of geographic location, common interests, and skill level.

19. The computer readable medium of claim 14, wherein a cost incurred for giving each clue is specified in a currency.

20. The computer readable medium of claim 14, further comprising instructions for:

presenting a plurality of clue-selection game displays to at least some of the plurality of players including the clue-giving player, wherein a clue-selection game display includes a representation of the list of clues and their respective cost weights, thereby allowing the clue-giving player to select clues from among the list of clues; and presenting a plurality of guessing game displays to at least some of the plurality of players including the guessing player, wherein a guessing game display includes a representation of clues selected by the clue-giving player and a countdown timer, wherein an initial value of the countdown timer is a function of cost weights assigned to the clues selected by the clue-giving player and shown to the guessing player, with more obvious clues causing the countdown timer to be more decremented than for less obvious clues, for sentiment-oriented words, and/or for words more useful for market research purposes.

* * * * *